United States Patent [19]
Vail III

[11] Patent Number: 6,014,895
[45] Date of Patent: Jan. 18, 2000

[54] DETERMINATION OF GRAVITY BY OBSERVATION OF DENSITY VARIATIONS IN GASES

[76] Inventor: William Banning Vail III, 3123-198th Pl. SE, Bothell, Wash. 98012

[21] Appl. No.: 08/927,551

[22] Filed: Sep. 6, 1997

[51] Int. Cl.$^7$ ...................................................... G01V 7/04
[52] U.S. Cl. ........................................ 73/382 R; 73/30.01
[58] Field of Search ............................... 73/380 R, 380 G, 73/30.02, 30.04, 30.01; 33/305, 306, 302, 303

[56] References Cited

U.S. PATENT DOCUMENTS

| | | | |
|---|---|---|---|
| 2,925,007 | 2/1960 | Silver | 73/30.02 |
| 3,011,347 | 12/1961 | Boitnott | 73/382 G |
| 3,618,061 | 11/1971 | Livers | 73/30.02 |
| 3,855,845 | 12/1974 | Homolka | 73/30.02 |
| 4,513,618 | 4/1985 | Lautzenhiser | 73/382 G |
| 4,602,508 | 7/1986 | Fitch et al. | 73/382 G |

*Primary Examiner*—Michael Brock

[57] ABSTRACT

Apparatus to measure gravity comprising means to measure density variations in a material. Apparatus to measure gravity comprising means to measure the distribution of masses in a material. The material may be a gas comprised of one molecular species, a gaseous mixture having at least two gaseous species, liquids, or other material. Laser light is absorbed by the materials, and the re-emmitted light is measured to determine gravity in one method of measurement. Other optical processes to measure gravity are described. Other physical parameters are measured to determine gravity. Density variations measured by microwave processes and nuclear processes are also described. Apparatus are described to provide sufficiently accurate measurements of gravity to be useful for routine measurements of gravity from within a borehole in the earth to locate and quantitatively identify the amount of gas present in a hydrocarbon reservoir.

10 Claims, 1 Drawing Sheet

DETERMINATION OF GRAVITY BY OBSERVATION OF DENSITY VARIATIONS IN GASES

BACKGROUND OF THE INVENTION

1. Field of the Invention

The field of the invention relates to apparatus to measure gravity. The field of the invention also relates to methods of operation of the apparatus to measure gravity. The field of the invention further relates to apparatus adapted to perform measurements of gravity from within a borehole in the earth. The field of the invention also relates to methods of operation of apparatus adapted to perform measurements of gravity from within the borehole in the earth.

2. Description of the Prior Art

It is well known in the geological sciences that measurements of gravity within a borehole could be used to locate and quantitatively identify the amount of gas present in a hydrocarbon bearing reservoir. However, the present state-of-the-art apparatus do not provide sufficiently accurate measurements of gravity in boreholes to be widely used on a routine commercial basis. Further, the present state-of-the-art apparatus are not capable of performing measurements rapidly enough, or fast enough, for routine commercial services. For example, please refer to W. M. Telford, L. P. Geldart, R. E. Sheriff, and D. A. Keys, "Applied Geophysics", Cambridge University Press, Cambridge, reprinted in 1981, page 803. It is also well known to researchers at Gas Research Institute (GRI) located in Chicago, Ill. that present devices to measure gravity within boreholes are generally inadequate for routine widespread commercial operations. GRI's present standard publicly available scientific papers and reports on gravity measurements are incorporated herein in their entirety by reference herein.

For the purposes of this application, standard geophysical terms are used such as those appearing in the following references, entire copies of which are incorporated herein by reference: (a) John T. Dewan, "Essentials of Modern Open-Hole Log Interpretation", PennWell Publishing Company, Tulsa, Okla., 1983; (b) editor, "Cased Hole Log Interpretation Principles/Applications", Schlumberger Educational Services, Houston, Tex., 1989; (c) and Robert D. Langenkamp, "The Illustrated Petroleum Reference Dictionary", Third Edition, PennWell Publishing Company, Tulsa, Okla., 1985.

At the time of the filing of the application herein, the applicant is unaware of any prior art that is particularly relevant to the invention.

SUMMARY OF THE INVENTION

An object of the invention is to provide apparatus to provide sufficiently accurate measurements of gravity to be useful for routine measurements of gravity from within a borehole in the earth to locate and quantitatively identify the amount of gas present. Another object of the invention is to provide methods of operation of the apparatus to provide sufficiently accurate measurements of gravity to be useful for routine measurements of gravity from within a borehole in the earth to locate and quantitatively identify the amount of gas present.

Yet another object of the invention is to provide apparatus to provide sufficiently accurate measurements of gravity rapidly enough to be useful for routine measurements of gravity from within a borehole in the earth to locate and quantitatively identify the amount of gas present. And finally, another object of the invention is to provide methods of operation of the apparatus to provide sufficiently accurate measurements of gravity rapidly enough to be useful for routine measurements of gravity from within a borehole in the earth to locate and quantitatively identify the amount of gas present.

DESCRIPTION OF THE PREFERRED EMBODIMENTS

Figure 1:
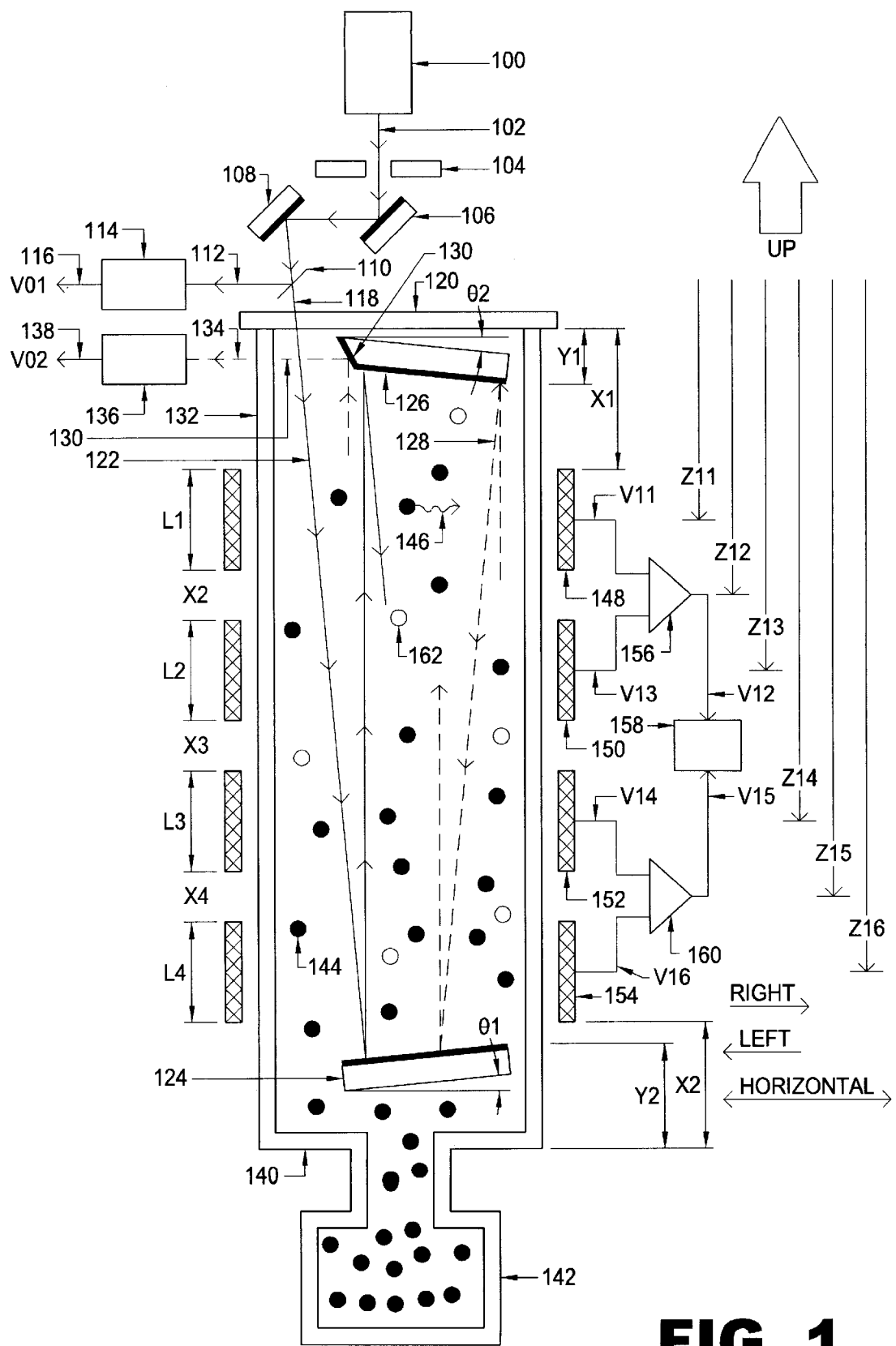
FIG. 1 shows a section view of an apparatus to measure gravity within a borehole.

Please refer to FIG. 1 that shows a section view of one of the preferred embodiments of the invention. Laser 100 puts out a laser beam 102 having at least one wavelength that proceeds through a an optical chopper 104 that reflects from first mirror 106 that proceeds to second mirror 108 that impinges on beam splitter 110. A first portion of the laser beam 112 having intensity I01 impinges on the first reference detector 114 having voltage output 116 that is voltage V01. A second portion of the laser beam 118 proceeds through transparent window 120. Once passing through transparent window 120, a portion of the laser beam 122 travels toward the lower cavity mirror 124. Laser beam 122 then reflects off the lower cavity mirror 124 towards the upper cavity mirror 126. The lower cavity mirror 124 is tilted through angle $\theta 1$ with respect to the horizontal and upper cavity mirror 126 is tilted through angle $\theta 2$ with respect to the horizontal such that the laser beam undergoes multiple reflections to and from each respective cavity mirror. The angles are adjusted such that the laser beam that initially traveled to the right "turns around" and begins to travel towards the left upon multiply reflecting to and from each cavity mirror. The inventor has used a similar multi-reflection geometry in an apparatus that measured the Polar Reflection Faraday Effect and such multiple-reflection geometries work in practice. In the end, if all the laser light had not been absorbed by gases within the instrument, then the final beam reflects from surface 130 and passes through transparent tube 132 as laser beam 134 having intensity I02 that impinges on second reference detector 136 having voltage output 138 that is voltage V02.

Transparent window 120, transparent tube 132, lower wall 140 and molecular source 142 comprise a vacuum tight system hereinafter designated as the "vacuum tight cavity". A resonant absorbing molecular structure 144 is in gaseous form within the vacuum tight cavity in the preferred embodiment shown in FIG. 1. The acronym "AMS" shall be used to denote the abbreviation for the term "absorbing molecular structure". It can be either singular or plural as the case may be.

In many preferred embodiments of the invention, the AMS is comprised of one or more atoms forming an "assemblage of atoms". In this preferred embodiment of the invention, at least one florescent dye molecule incorporated within or attached the assemblage of atoms. Each AMS has total mass M(AMS). In this preferred embodiment, the AMS with its attached florescent dye molecule resonantly absorbs the laser light output from laser 100. This light is absorbed in at least one wavelength that the laser is generating. Put another way, each AMS "fluoresces" after laser light is absorbed. Here, M(AMS) means the total mass of the assemblage that includes the mass of any fluorescent dye molecule that may be attached to other atoms (or assemblages of atoms) such as to bismuth, lead, etc. for example. Such fluorescent molecules are used in the biotechnology industry as biological markers. Such molecular structures are also used in research involving 3-D optical memory devices.

A photon released by an AMS after it "fluoresces" is shown as element 146 in FIG. 4.

A first cylindrical detector 148 of radius r1 (not shown) surrounds transparent tube 132 that measures light. It has length L1 and is centered at depth Z11.

A second cylindrical detector 150 of radius r1 (not shown) surrounds transparent tube 132 that measures light. It has length L2 and is centered at depth Z13.

A third cylindrical detector 152 of radius r1 (not shown) surrounds transparent tube 132 that measures light. It has length L3 and is centered at depth Z14.

A fourth cylindrical detector 154 of radius r1 (not shown) surrounds transparent tube 132 that measures light. It has length L4 and is centered at depth Z16.

The voltage output from the cylindrical detector 148 is V11 that is one input into differential amplifier 156. The voltage output from cylindrical detector 150 is V13 that is the other input into differential amplifier 156. The output of differential amplifier 156 is V12 which is an input to processor 158.

The voltage output from the cylindrical detector 152 is V14 that is one input into differential amplifier 160. The voltage output from cylindrical detector 160 is V16 that is the other input into differential amplifier 160. The output of differential amplifier 160 is V15 which is another input to processor 158.

To improve the response time of the instrument, a light, fast gas molecule 162, such as helium, may be introduced into the vacuum tight cavity. Any such light molecule has mass M(TH), for "thermalization". However, the device will work with just one molecular species or with many different molecular species mixed together. The invention has many variants.

The average temperature T and pressure P in the vacuum tight cavity are also measured and forwarded to processor 158. In other preferred embodiments, sensors are provided to measure the temperatures and pressures at many different points within the vacuum tight cavity. However, the temperature and pressure sensors are not shown in FIG. 1 for simplicity.

Not shown in FIG. 1 are the typical elements of the phase sensitive detection system that the inventor typically uses for most precision measurements and which are widely understood in the industry. A voltage reference source (not shown in FIG. 1) is used to drive a power amplifier (not shown in FIG. 1) that in turn is used to drive the optical chopper 104. That voltage reference source is also provided as another input to the processor 158 for timing purposes (not shown in FIG. 1). Typical phase sensitive detection techniques can then be used to reduce any noise present in the system. The above are not shown in FIG. 1 for the purposes of simplicity only.

From the physics involved, and to first order, it is evident that:

$(V13-V11)/V01 = \eta \ g(Z12)$   Equation 100.

Here, g(Z12) is the acceleration of gravity measured by cylindrical sensors 148 and 150 at the position Z12. The parameter η is related to at least the pressure, temperature, the masses present, the details of the geometry of the detectors, and other factors as well.

Again, to first order, it is evident that:

$(V16-V14)/V01 = \eta \ g(Z15)$   Equation 101.

Here, g(Z15) is the acceleration of gravity measured by cylindrical sensors 152 and 154 at the position Z15. It is assumed here that the apparatus is designed so that η is the same for Equations 100 and 101.

So, subtracting Equation 100 from Equation 101:

$\{g(Z15)-g(Z12)\}\eta = \{(V16-V14)/V01\}-\{(V13-V11)/V01\}$   Equation 102.

Now, for a few definitions:

$\delta g = g(Z15) - g(Z12)$   Equation 103.

$\kappa = 1/\eta$   Equation 104.

$\delta v = \{(V16-V14)/V01\}-\{(V13-V11)/V01\}$   Equation 105.

$\delta g = \kappa \ \delta v$   Equation 106.

Now, another definition:

$\delta z = Z(15) - Z(12)$   Equation 107.

Then, Equation 106 becomes:

$\delta g/\delta z = \kappa \ \delta v/\delta z$   Equation 108.

This equation looks the same as Equation 17 in the earlier U.S. Disclosure Document in the portion of that document dated Jul. 24, 1997. However, here, the measured quantities are different. In the previous case, optical rotation, and not absorption, was measured. In this case, fluorescence is measured. It is worthwhile to note that Equation 108 is only correct to first order, and it is likely that higher order errors need to be considered carefully in later analysis.

Another embodiment of the invention has the upper and lower cavity mirrors 126 and 124 respectively designed to permanently trap the laser beam so that it bounces back and forth endlessly until the radiation is entirely absorbed by the molecules (and in part by the surfaces of the mirrors). There is a trade-off between the number of repetitive passes through the gas and the M(AMS).

If the laser made only one single pass, then M(AMS) would have to be very heavy for a cell 1 meter long to work well. Perhaps M(AMS) would each have to have the mass of several thousand lead atoms. However, with increasing number of passes, there is a decrease in the required mass M(AMS).

A coordinate system may be easily established with respect to elements shown in FIG. 1 that is used to describe the position of any AMS within the "vacuum tight cavity" defined above. Any distance above the interior portion of lower wall 140 shall be called the vertical position "z" that is not shown in FIG. 1 for the purposes of simplicity. The axis of the laser beam 102 as it emerges from laser 100 is along the hypothetical "center-line" of the transparent tube 132, although that "center-line" is not shown in FIG. 1 for the purposes of simplicity. At any vertical position z, and using typical cylindrical coordinates, a particular AMS may be at radius r from that center-line and at angle Φ. The "zero" in the angle Φ may be conveniently chosen such as by setting it equal to the direction of the first reference detector 114 as an example. For the purposes of simplicity, r and Φ are not shown in FIG. 1. The point of this is that any AMS may be uniquely located at any position within the "vacuum tight cavity" by specifying z, r, and Φ.

The relative fractional probability P of a given mass M(AMS) being at position z within the vacuum tight cavity is given by a version of the Boltzmann distribution, an approximation of which is given as follows:

$$P = (1 - e^{-\{M(AMS)gz/kT\}})  \quad \text{Equation 109.}$$

For additional details, please refer to B. Yavorsky and A. Detlav, "Handbook of Physics", Second Edition, MIR Publishers, 1975, page 228, an entire copy of which is included herein by reference. Another form of the above equation results in the so-called "barometric height formula".

In Equation 109, P is the relative fractional probability and is dimensionless (a numerical fraction). In Equation 109, M(AMS) and z have already been previously defined. The quantity g is the acceleration of gravity or 9.80 meters/$sec^2$ on the surface of the earth. The quantity k is the Boltzmann constant that is $1.38 \times 10^{-23}$ Joules/° K. These constants and the related definitions are from David Halliday and Robert Resnick, "Physics", Parts I and II, Combined Third Edition, John Wiley & Sons, Inc., 1978, an entire copy of which is included herein by reference.

As an example, applicant will choose a mass M1(AMS) having about 2000 times the weight of a lead atom. Lead has an atomic weight of about 207.2 (Editor, "Handbook of Chemistry and Physics", 61st Edition, CRC Press, Inc., Boca Raton, Fla., 1981, an entire copy of which is included herein by reference). Using an approximation that the mass of lead is equal to the atomic weight times the rest mass of a proton:

$$M1(AMS) = (2,000)(207.2)1.67 \times 10^{-27} \text{ kilograms} \quad \text{Equation 110}$$
$$= 6.92 \times 10^{-22} \text{ kilograms}$$

For borehole measurements, the temperature is typically 100 degrees C or 373° K. Therefore, at this temperature, the exponential factor in Equation 109 becomes:

$$\{M1(AMS)gz/kT\} = 1.32z/\text{meter} \quad \text{Equation 111.}$$

For these numbers, and if the vacuum tight cavity were sufficiently long to have z=1.0 meters, then the relative probability P of M1(AMS) being at the position of z=1.0 meters compared with z=0 meters, is given by:

$$P = (1 - e^{-\{1.32\}}) = 0.27 \quad \text{Equation 112.}$$

So, at z=0, there are roughly 4 times as many atoms per unit volume having mass M1(AMS) as at z=1 meter.

It is evident that there is a Characteristic Length L in this problem given by:

$$M1(AMS)g/kT = 1/L \quad \text{Equation 113.}$$

The Characteristic Length L has the units of meters. In terms of the design of the apparatus in FIG. 1, it is evident that the longer L, then the more reflections would be required to make devices of equivalent sensitivity—all other factors being equal.

At any given position with the vacuum tight cavity specified by z, r, and Φ, different parameters may be used to describe the distribution of masses M(AMS).

The number of masses per unit volume at any position within the vacuum tight cavity may be specified. If mixtures of gases are used, the particular number of masses of any given type per unit volume at any position may be specified. For the purposes herein, the term "the distribution of masses" shall mean the specification of the number of masses, and the specification of the different types of masses present, per unit volume at any given position within the vacuum tight cavity.

As an example, if 3 different masses were used, respectively 2000 times the weight of lead, 100 times the weight of lead, and helium atoms, then the distribution of masses at a given location within the vacuum tight cavity would specify the masses present per unit volume at the particular location.

For the purposes herein, the term "density variations" shall mean the determination of any differences between a first distribution of masses at a first location within the vacuum tight cavity and a second distribution of masses at a second location within the vacuum tight cavity.

For the purposes herein, different masses may also be called "different species".

In simple systems, the "mass distribution" is the mass per unit volume at any given position within the vacuum tight cavity. In principle, the invention will work with any mass distribution. Even liquids can be used, but the "settling time" following shock in a borehole may preclude the routine use of fluids to measure gravity. However, judiciously chosen mass distributions in accordance with the above may increase the sensitivity of one embodiment of the invention compared to another.

It is generally known in the geophysics literature that measurement of gravity to a sensitivity of 1 part in $10^{10}$ of the acceleration of gravity on the surface of the earth is sufficient accuracy for widespread use. In bright sunlight, the photon flux density is on the order of $10^{21}$ photons/$meter^2$ per second (see page 56 of Eugene Hecht and Alfred Zajac, op. cit.). using the "square root of N over N" type counting statistics, this level of brightness can yield measurements that are accurate to about 1 part in $10^{10}$ in one second! Of course, lasers are much, much brighter than sunlight, so that the invention will provide sufficiently accurate measurements of gravity to be useful for routine measurements of gravity from within a borehole in the earth to locate and quantitatively identify the amount of gas present.

As an example of a calculation of the required energy delivered to an optical detector, it is useful to note that the center of the optical spectrum is at the wavelength of about 550 nano-meters. Using Planck's constant, and typical equations for light, the energy of a single photon at this wavelength is computed to be 3.62 $10^{-19}$ Joules. For such calculations, see pages 893 and 1099 of David Halliday and Robert Resnick, op. cit. So, a beam of about 3 watts impinging on a detector intrinsically has information available to an accuracy of 1 part in $10^{10}$ as stated above. So, lasers with about 20 watts of output power would be ideal for an embodiment of the invention shown in FIG. 1.

Certain embodiments of the invention will be largely immune to vibrations and movements downhole. This would be a great improvement over any of the current devices now in use that require stationary, long term measurements. It is hoped that vibrations will appear to the measurement system as just one more means of "thermalization" such as that caused by a helium atom. Other vibration isolation systems may be used with the invention as well to "shock isolate" the vacuum tight cavity. In the end, certain embodiments of the invention will provide sufficiently accurate measurements of gravity rapidly enough to be useful for routine measurements of gravity from within a borehole in the earth to locate and quantitatively identify the amount of gas present.

FIG. 1 presents the apparatus in a substantially "vertical" position. Equation 108 properly predicts that the output of the device will be a relative zero if the device in FIG. 1 is placed horizontally. The invention will have a reasonable response if it is oriented along any axis having angle ω with respect to the vertical direction. However, the details of that response will be dependent upon many factors including at least the angle ω, the geometry of the vacuum tight cavity, and the path of the laser light.

The actual sensitivity of the device in FIG. 1 is related at least to the intensity of the laser, the optical absorption cross section of the AMS, the distribution of masses within the vacuum tight cavity, the Characteristic Length L, the geometry of the cylindrical detectors, the efficiency of the cylindrical detectors to detect the light (their quantum efficiency), the geometry of the vacuum tight cavity, its orientation in the Earth's gravitational field, among many other parameters.

Many of the preferred embodiments described to this point have made use of the "AMS", or "absorbing molecular structures". The AMS may be chosen to absorb light at one wavelength or an many wavelengths. Equivantly, the AMS may be chose to absorb light at one frequency or at many frequencies. In other preferred embodiments of the invention, the laser 100 produces many different wavelengths, and the AMS absorbs one or more of those wavelengths.

Many of the preferred embodiments described to this point have made use of the "AMS" having a fluorescent dye attached to it. However, such dye taggants may not be necessary. Under ideal circumstances, the chemicals comprising the AMS will resonantly absorb light at the same wavelength, or at several of the wavelengths, provided by the laser. As an example, a laser using neodymium as a part of its lasing material can be used and the AMS can contain one or more neodymium atoms. As another example, a laser using krypton as a part of its lasing material can be used and the AMS can contain one or more krypton atoms. As yet another example, a laser using cadmium as part of its lasing material can be used and the AMS can contain one or more cadmium atoms.

It must be emphasized that the AMS need not physically actually absorb light and re-emit it for the invention to work. In other words, it is NOT necessary for the AMS to "fluoresce". In fact, any type of light scattering, or light absorption and re-radiation process, or naturally occurring radiation process of any type may be used to measure gravity with the invention. For the purposes herein, these methods are all called "optical processes". For the purposes herein, the devices that use the "optical processes" as methods of operation are called "optical means". Many different types of optical processes may be used to measure gravity with the invention, and several of the different optical processes are described in the following references, entire copies of which are included herein by reference: (a) Editor, "Handbook of Optics", McGraw-Hill Book Company, New York, N.Y., 1978; (b) Eugene Hecht/Alfred Zajac, "Optics", Addison-Wesley Publishing Company, Menlo Park, Calif., 1979; (c) Grant R. Fowles, "Introduction to Modern Optics", Holt, Rinehart and Winston, Inc., New York, N.Y., 1968; and (d) Warren Smith, "Modern Optical Engineering, The Design of Optical Systems", McGraw-Hill Book Company, N.Y., 1966.

It is also worth mentioning that the AMS must not optically block transparent window 120 and any portion of the transparent tube 132 adjacent to the first reference detector 114, adjacent to the second reference detector 136, or adjacent to the respective cylindrical detectors 148, 150, 152, and 154 shown in FIG. 1. The AMS must not block, or coat the portions of the embodiment in FIG. 1 when optical light is being measured. This is not an unusual situation. For example, similar problems were encountered in the development of rubidium optical pumping magnetometers wherein in very early prototype instruments, rubidium would block or coat portions of the optical sensors. As it turns out, the selective use of heaters on various portions of the optical elements, and the use of buffer gases, such as helium, were used to keep similar portions of the sensors for optical pumping magnetometers transparent as desired. Similarly techniques and methods shall be used in the embodiment of the invention in FIG. 1 to prevent undesirable coating or blocking of the optical beams, although those techniques are not shown in FIG. 1 for the purposes of brevity.

Different types of optical processes also include the specific use of a source of microwaves that replaces the laser 100 in FIG. 1 in another embodiment of the invention. The scattering of microwave energy from the masses within the vacuum tight cavity would be used to measure gravity. Of course, the cylindrical detectors 148, 150, 152 and 154 would have to be replaced with detectors sensitive to microwaves. This embodiment of the invention provides another method to measure density variations in a material. Any such embodiment provides another means to measure density variations in a material.

By analogy, in another embodiment, the laser would be replaced with a particle source, such as with a neutron source, and scatting of neutrons, and/or the absorption and re-emission of gamma rays could be used to measure gravity. Of course, the cylindrical detectors 148, 150, 152 and 154 would have to be replaced with detectors sensitive to the neutrons or gamma rays as the case may be. This embodiment of the invention provides another method to measure density variations in a material. Any such embodiment provides another means to measure density variations in a material.

In another embodiment of the invention, no laser is needed at all if black-body radiation is measured with the various optical detectors surrounding the vacuum tight cavity. However, the use of the external laser would in many embodiments improve the sensitivity and decrease the measurement time. This embodiment provides another method to measure density variations in a material. Any such embodiment provides another means to measure density variations in a material.

In another embodiment of the invention, no laser is needed but radioactive particles replace the AMS. Then, naturally occurring radioactive decay is measured to determine gravity. However, in this case, the cylindrical detectors 148, 150, 152 and 154 would have to be replaced with detectors sensitive to naturally occurring radioactive particles. This embodiment provides yet another method to measure density variations in a material. Any such embodiment provides another means to measure density variations in a material.

In another embodiment of the invention, no laser is needed but the electrical conductivity of the material measured to measure density variations in the material. The material may be either a gas or liquid. In this case, the cylindrical detectors 148, 150, 152 and 154 would have to be replaced with current and voltage measurement electrodes that are in electrical contact with the material. The conductivity is due to certain particles within the material carrying electricity. The conductivity is then measured to determine the distribution of masses, or density variations, of the particles within the material to in turn, measure gravity, as in other embodiments. This embodiment provides yet another method to measure density variations in a material.

Any such embodiment provides another means to measure density variations in a material.

The immediately preceding preferred embodiment is just one example wherein the electrical conductivity measured is proportional to the distribution of masses and/or the density variations in the material. There are many different embodiments of the invention wherein the parameter that is measured is proportional to the distribution of masses and/or density variations. Electrical conductivity is one, the electrical resistivity is another, pressure is another, pressure variations within the vacuum tight cavity is another, pressure variations along the wall of the vacuum tight cavity is another, dielectric properties is another, permittivity is another, viscosity is yet another, etc. All of these parameters, conductivity, resistivity, etc., can be measured at one or more frequencies, where said measurements at different frequencies are either performed simultaneously or in sequence. In these embodiments of the invention, no laser is needed, but a parameter that is related to the distribution of masses and/or density variations is measured to measure the distribution of masses and/or density variations in the material. In this case, the cylindrical detectors 148, 150, 152 and 154 would have to be replaced with suitable detectors to measure the parameter chosen. The observed parameter is then measured to determine the distribution of masses and/or density variations in the material to in turn, measure gravity, as in other embodiments. Any such embodiment provides another method to measure density variations in a material to obtain information useful to measure gravity. Any such embodiment provides another means to measure density variations in a material to obtain information useful to measure gravity. Any such embodiment provides another method to measure the distribution of masses in a material to obtain information useful to measure gravity. Any such embodiment provides another means to measure the distribution of masses in a material to obtain information useful to measure gravity. Many such parameters are described in the following references, entire copies of which are incorporated herein by reference: Adrian Melissinos, "Experiments in Modern Physics", Academic Press, New York, 1966; F. K. Richtmyer and E. H. Kennard, "Introduction to Modern Physics", McGraw-Hill Book Company, New York, 1947; Robert M. Basancon, "The Encyclopedia of Physics", Van Nostrand Reinhold Company, New York, 1966; G. P. Harnwell and J. J. Livingood, "Experimental Atomic Physics", McGraw-Hill Book Company, New York, 1933; J. M. Ziman, "Principles of The Theory of Solids", Cambridge at the University Press, Cambridge, Great Britain, 1965; Charles Kittel, "Introduction to Solid State Physics", Fifth Edition, John Wiley & Sons, New York, 1976; John G. Webster, "Medical Instrumentation, Application and Design", Houghton Mifflin Company, Boston, 1978; Donald Fink, "Electronics Engineers' Handbook", McGraw-Hill Book Company, New York, 1975; Douglas Considine, "Process Instruments and Controls Handbook", Third Edition, McGraw-Hill Book Company, New York, 1985; in the book entitled "Practical Instrumentation Transducers", a copy of which is not immediately available to applicant for proper reference herein; and in the other references already cited herein. Any observed parameter described in these references that can be used to determine the distribution of masses and/or density variations in the material to in turn, measure gravity, is another embodiment of the invention.

As a final point, the invention may be used to measure gravity in almost any situation. This includes on the surface of the earth and elsewhere. While certain embodiments above have focused on measurements of gravity within a borehole for geophysical purposes, it is to be emphasized that the invention may be used to measure gravity almost anywhere. Applicant explicitly does not limit the use of the invention to measure gravity within boreholes.

While the above description contains many specificities, these should not be construed as limitations on the scope of the invention, but rather as exemplification of preferred embodiments thereto. As have been briefly described, there are many possible variations. Accordingly, the scope of the invention should be determined not only by the embodiments illustrated, but by the appended claims and their legal equivalents.

What is claimed is:

1. Apparatus to determine gravity having a gaseous mixture comprised of a first and a second molecular species, and possessing a measurement means, wherein said first molecular species has greater mass than said second molecular species, wherein said second molecular species is a buffer gas provided to minimize spurious density variations in said first molecular species, and wherein said measurement means determines the density variations in said first molecular species determine gravity.

2. The method comprising at least the step of measuring the distribution of masses of a first molecular species in a gaseous mixture having a first and second molecular species to provide information useful to measure gravity, wherein the mass of said first molecular species is greater than the mass of said second molecular species.

3. The method in claim 2 wherein optical processes are used to measure said distribution of masses of said first molecular species.

4. The method determine gravity in a gaseous mixture having a first and second molecular species, wherein the mass of said first molecular species is greater than the mass of said second molecular species, wherein said second molecular species is a buffer gas provided to minimize spurious density variations, and wherein the density variations in said first molecular species are measured to determine gravity.

5. The method in claim 4, wherein the first molecular species is rubidium vapor.

6. The method in claim 4 wherein the buffer gas is helium gas.

7. The method determine gravity in a gaseous mixture having a first molecular species and a plurality of other molecular species, wherein the mass of said first molecular species is greater than the mass of any constituent species of said plurality species, wherein at least one of said plurality species is a buffer gas provided to minimize spurious density variations, and wherein the density variations in said first molecular species are measured to determine gravity.

8. Apparatus having measurement means to determine gravity, wherein said measurement means possesses a gaseous medium comprised of gas molecules, whereby each gas molecule is comprised of a fluorescent dye molecule chemically attached to different molecular species to make an absorbing molecular structure, wherein said measurement means further possesses a light source producing light having at least one wavelength absorbed by said absorbing molecular structure, whereby said measurement means determines the density of said gaseous medium to determine gravity.

9. The apparatus in claim 8 wherein the mass of said absorbing molecular structure is greater than the mass of a lead atom.

10. The apparatus in claim 8 wherein the mass of said absorbing molecular structure is approximately 2000 times the mass of a lead atom.

* * * * *